US010552685B2

(12) United States Patent
Clark et al.

(10) Patent No.: US 10,552,685 B2
(45) Date of Patent: Feb. 4, 2020

(54) SYSTEMS AND METHODS FOR LOCATING PHYSICAL OBJECT USING LIVE IMAGE FEEDS

(71) Applicant: Walmart Apollo, LLC, Bentonville, AR (US)

(72) Inventors: Jimmie Russell Clark, Fayetteville, AR (US); Ryan Stalder, Rogers, AR (US); Gregory Sieranski, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 77 days.

(21) Appl. No.: 15/485,847

(22) Filed: Apr. 12, 2017

(65) Prior Publication Data
US 2017/0293806 A1    Oct. 12, 2017

Related U.S. Application Data

(60) Provisional application No. 62/321,493, filed on Apr. 12, 2016.

(51) Int. Cl.
*G06K 9/00* (2006.01)
*H04N 5/00* (2011.01)
*H04N 5/232* (2006.01)

(52) U.S. Cl.
CPC ..... *G06K 9/00771* (2013.01); *H04N 5/23206* (2013.01)

(58) Field of Classification Search
CPC ........................ H04N 5/23206; G06K 9/00771
See application file for complete search history.

(56) References Cited

U.S. PATENT DOCUMENTS 8,065,353 B2   11/2011   Eckhoff-Hornback et al.
8,135,629 B2    3/2012   Fuzell-Casey et al.
(Continued)

FOREIGN PATENT DOCUMENTS

CA    2807398 A1    8/2013

OTHER PUBLICATIONS

International Search Report and Written Opinion from related international patent application serial No. PCT/US2017/027227 dated Jul. 17, 2017.

*Primary Examiner* — Zhihan Zhou
(74) *Attorney, Agent, or Firm* — McCarter & English, LLP; David R. Burns

(57) ABSTRACT

Described in detail herein are systems and methods for providing a live image feed of a physical object in a section within the facility. In exemplary embodiments, physical objects can be disposed in a facility within multiple sections. Image capturing devices and kiosks can also be disposed in the facility. A kiosk can receive a search input string associated with a physical object. The kiosk can transmit the search input string to the central computing system. The central computing system can determine the exact physical location within the section of the facility in which the physical object is supposed to be disposed. The central computing system can determine the closest image capturing device to the exact physical location within the section of the facility in which the physical object is supposed to be disposed. The central computing system can control the determined image capturing device to capture a live video feed of the exact physical location within the section of the facility in which the physical object is supposed to be disposed. The central computing system can switch the input of the kiosk to display the captured live video feed.

12 Claims, 7 Drawing Sheets

(56) References Cited

U.S. PATENT DOCUMENTS

| | | | |
|---|---|---|---|
| 8,254,881 B2 | 8/2012 | Shaw et al. | |
| 9,189,973 B2 | 11/2015 | Wexler et al. | |
| 2001/0044751 A1* | 11/2001 | Pugliese, III | G06Q 30/02 |
| | | | 705/14.1 |
| 2004/0104930 A1 | 6/2004 | Stoler | |
| 2005/0149414 A1 | 7/2005 | Schrodt et al. | |
| 2008/0066103 A1* | 3/2008 | Ellis | H04N 5/44591 |
| | | | 725/38 |
| 2011/0055289 A1* | 3/2011 | Ennis | G06Q 10/06 |
| | | | 707/805 |
| 2012/0295704 A1* | 11/2012 | Reiche | A63F 13/06 |
| | | | 463/31 |
| 2012/0310757 A1 | 12/2012 | Kim et al. | |
| 2013/0253982 A1 | 9/2013 | Sciore | |
| 2014/0156470 A1* | 6/2014 | Raman | G06Q 30/0641 |
| | | | 705/27.1 |
| 2014/0267645 A1* | 9/2014 | Wexler | G09B 21/006 |
| | | | 348/62 |
| 2015/0070490 A1* | 3/2015 | Berlic | H04N 7/183 |
| | | | 348/135 |
| 2015/0341599 A1* | 11/2015 | Carey | H04N 7/181 |
| | | | 348/150 |
| 2016/0063712 A1* | 3/2016 | Matsumoto | H04N 7/18 |
| | | | 348/143 |

\* cited by examiner

SYSTEMS AND METHODS FOR LOCATING PHYSICAL OBJECT USING LIVE IMAGE FEEDS

CROSS-REFERENCE TO RELATED PATENT APPLICATION

This application claims priority to U.S. Provisional Application No. 62/321,493 filed on Apr. 12, 2016, the content of which is hereby incorporated by reference in its entirety.

BACKGROUND

Determining the physical location of a physical objects in a facility can be difficult, particularly when there are many different physical objects are disposed in throughout the facility and there is no a priori knowledge of the specific locations of the physical objects.

BRIEF DESCRIPTION OF DRAWINGS

Illustrative embodiments are shown by way of example in the accompanying drawings and should not be considered as a limitation of the present disclosure.

DETAILED DESCRIPTION

Described in detail herein are systems and methods for locating physical objects using live image feeds of locations of in a facility. In exemplary embodiments, physical objects can be distributed throughout a facility. For example, the physical objects can be disposed in various sections of the facility, e.g., based on the type of physical objects. Image capturing devices and kiosks can also be disposed in the facility. The kiosks can receive search input strings associated with a physical object and can transmit the search input strings to a central computing system. The central computing system can determine the physical location within the section of the facility at which the physical object is supposed to be disposed. The central computing system can determine the closest image capturing device to the exact physical location within the section of the facility in which the physical object is supposed to be disposed and can control the image capturing device to capture a live image feed of the physical location within the section of the facility at which the physical object is supposed to be disposed. The central computing system can switch an input feed of the kiosk to display the captured live image feed.

In exemplary embodiments, the central computing system analyzes the live image feed captured by the first one of the image capturing device to confirm the physical object is included in the live image feed. In response to detecting that the physical object is not included in the live image feed, the central computing system can identify other locations in the facility which can include the physical object and can determine whether the physical object is located at any of the other locations; and/or can identify a substitute physical object for the at least one physical object and detect the substitute physical object is captured in the live image feed. The central computing system can identify another (e.g., a second) one of the image capturing devices configured to capture another (e.g., a second) live image feed of another (e.g., second) physical location at which the physical object and/or the substitute physical object should be disposed.

In exemplary embodiments, the at least one of the kiosks can be located at an entrance of a facility and is associated with a first subset of the image capturing devices to view multiple sections of the facility.

In exemplary embodiments, a group of kiosks can be associated with particular areas of a facility and each kiosk in the group of kiosks can be associated with a subset of the group of image capturing devices.

Figure 1:
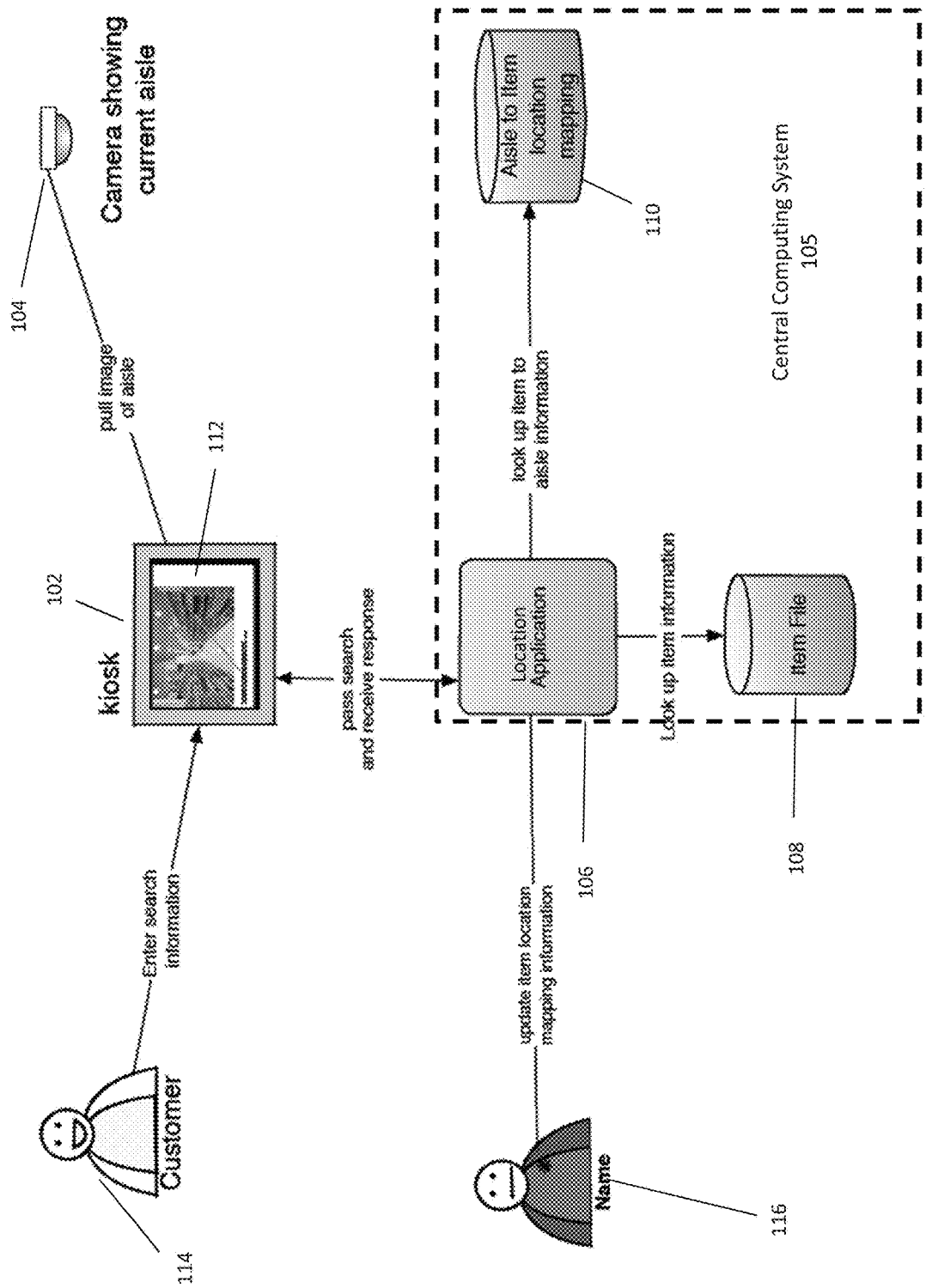
FIG. 1 is a block diagram illustrating a locating system for locating physical objects using live image feeds according to exemplary embodiments.

FIG. 1 is a block diagram illustrating an environment 100 in which locations of physical objects in a facility can be identified via live images feeds within the facility. As non-limiting example of embodiments of the present disclosure, a kiosk 102 can include a user interface through which the kiosk 102 can receive a search string from a user 114. The search string can be associated with a physical object. The search string can be an alphanumeric string. For example, the search string can describe the physical object, include a unique identifier associated with the physical object, include key words that can be attributed to the physical object, and/or can include any other suitable strings. The kiosk can be communicatively coupled to a central computing system 105 executing a locating application 106. The kiosk 102 can transmit the received search string to a locating application 106, which can query an item file database 108 using the search input string to retrieve information associated with one or more physical objects that correspond to the search string. For example, the locating application 106 can retrieve names, descriptions, types, designated locations of the physical objects, and quantities of the physical objects, graphical representations of the physical objects, and/or any other suitable information related to the physical objects. The information, including, for example, graphical representations and/or descriptions of the one or more physical objects can be rendered on a display of the kiosk 102. The user 114 can select one of the graphical representation of one of the physical objects and the selection can be transmitted to the locating application 106. In response to the selection, the locating application 106 can query an aisle-to-item location mapping database 110 to retrieve information related to a particular section in the facility at which the physical object is designated to be disposed. The locating application 106 can also retrieve from the aisle to item location mapping database 110 a specific physical location within the particular section of the facility at which the physical object is supposed to be disposed.

The locating application 106 can be configured to be in communication with a group of image capturing devices disposed in the facility. The locating application 106 can determine which of the image capturing devices in the group of image capturing device is closest in proximity to the specific location at which the physical object is supposed to be disposed and/or can determine which of the image capturing devices is positioned to capture a suitable unobstructed live image feed 112 of the specific physical location.

For example, the locating application 106 can determine that the image capturing device 104 is closest in proximity to the designated physical location of the physical object, and/or is suitably positioned to capture a live image feed 112 of the specific physical location. The locating application 106 can control the image capturing device 104 to capture a live image feed 112 of the specific physical location at which the physical object should be disposed and can switch an input feed of the kiosk 102 to display the live image feed 112 at the kiosk 102. In exemplary embodiments, the locating application can control the image capture device 104 and/or can manipulate the live image feed 112 from the image capture device to zoom in on the specific physical location. The locating application 106 can also overlay one or more indicators on the live image feed 112 to denote the exact or estimate location of the physical object in the live image feed 112.

The locating application 106 can be configured to determine that the physical object is not present at the specific physical location based on the information retrieved from the item file database 108 (e.g., information related to a quantity of physical objects). Alternatively, or in addition to using the information retrieved from the item file database 108, the locating application 106 can analyze the live image feed 112 captured by the image capturing device 104 to determine whether the physical object has been captured in the live image feed 112. For example, the locating application 106 can use machine vision to determine the physical object is not at the specific physical location at which the physical object is supposed to be disposed. The locating application 106 can use one or more machine vision techniques to determine whether the physical object is included in the live image feed 112. For example, the locating application 106 can use edge detection to detect object edges to determine the presence of an object, segmentation techniques that partition live image feed 112 into multiple segments, pattern matching techniques that attempt to match a patterns in the live image feed 112 with patterns corresponding the physical object, color matching techniques that attempt to match colors in the live image feed 112 with a color scheme corresponding to the physical object, text recognition techniques that attempt to extract text from the live image feed 112 and match the extract text to text on the physical object, and/or any other suitable machine vision techniques.

In response to determining the physical objet is not included in the live image feed 112, the locating application 106 can query the item file database 108 for physical objects similar to the searched physical object. The locating application 106 can transmit a list of similar physical objects to the kiosk 102, and the kiosk 102 can render the list on the display. The kiosk 102 can receive a selection from the user 114 of one of the similar physical objects from the list, and can transmit the selection to the locating application 106. The locating application 106 can determine the specific designated physical location of the selected similar physical object within a section of the facility. The locating application 106 can determine the closest (and/or suitably positioned) image capturing device 104 to the specific designated physical location of the selected similar physical object. The locating application 106 can control the image capturing device 104 to capture a live image feed 112 of the specific designated physical location of the selected similar physical object. The locating application 106 can switch an input feed of the kiosk 102 to display the live image feed 112 at the kiosk 102.

As non-limiting example of embodiments of the present disclosure, the system described above can be embodied as an item locator in a retail store. For example, the facility can be embodied as a retail store, the physical object can be embodied as an item sold at the retail store and the user can be a customer. The items can be disposed in various aisles within the retail store. The retail store can have multiple image capturing devices disposed along the aisles of the retail store. In exemplary embodiments, the customer 114 can enter an search string at the kiosk 102 to search for an item. The search string can be an alphanumeric string such as a UPC code, item name, item brand, and/or any other suitable alphanumeric string. The kiosk 102 can transmit the search input string to the central computing system 105, and the central computing system 105 can execute the locating application 106 to query the item file database 108 for item data associated with the searched item using the search string. The locating application 106 can retrieve a name of the item, a type of the item, one or more designated locations of the item, and a quantity of the item at the retail store. The central computing system 105 can execute the locating application 106 to query the aisle-to-item location mapping database 110 to retrieve the specific aisle and physical location within the aisle at which the item is supposed to be disposed. The locating application 106 can determine the closest (and/or suitably positioned) image capturing device 104 with respect to the specific designated physical location of the item within the aisle at which the item is supposed to be disposed. The locating application 106 can control the image capturing device 104 to capture the live image feed 112 of the physical location within the aisle, and can switch an input feed of the kiosk 102 to display the live image feed 112 at the kiosk 102.

For example, the user 114 can search for a 24 pack of Coca-Cola® using the input string "24 Coca-Cola®." The kiosk 102 can transmit the search input string "24 Coca-Cola®" to the central computing system 105, which can execute the locating application 106 to query the item file database 108 to retrieve the name, brand designated location and quantity of 24 packs of Coca-Cola® available at the retail store. The central computing system 105 can execute the locating application 106 to query the aisle-to-item location mapping database 110 to determine the specific designated physical location of 24 packs of Coca-Cola® within an aisle. The locating application 106 can determine the closest (and/or suitably positioned) image capturing device 104 to the specific designated physical location of the 24 packs of Coca-Cola® and can control the image capturing device 104 to capture a live feed of the 24 packs of Coca-Cola® in the aisle. The application 106 can switch an input feed of the kiosk 102 to display the live image feed 112 including the 24 packs of Coca-Cola® at the kiosk 102.

As another example, the user 114 can search for a 24 pack of Coca-Cola® which can be unavailable at the retail store, the locating application 106 can determine based on the retrieved data from the item file database 108 that two 12 packs of Pepsi® or four 6 packs of Pepsi® can be substituted in place of the order of 24 pack of Coca-Cola®. The locating application 106 can prompt the user 114 via the kiosk 102 to select either the two 12 packs of Pepsi® or four 6 packs of Pepsi®. The kiosk 102 can receive the selection of the two 12 packs of Pepsi® from the user 114. The kiosk 102 can transmit the selection to the central computing system, which can execute the locating application 106 to query the aisle-to-item location mapping database 110 to determine the physical location of 12 packs of Pepsi® within an aisle at which the 12 packs of Pepsi® are supposed to be disposed. The locating application 106 can determine the closest (suitably positioned) image capturing device 104 to the designated physical location of the 12 packs of Pepsi® and can control the image capturing device 104 to capture a live feed of the 12 packs of Pepsi® in the aisle. The locating application 106 can switch an input feed of the kiosk 102 to display the live image feed 112 including the 12 packs of Pepsi® at the kiosk 102.

In another embodiment, the application 106 can select an image capturing device to capture a live image feed of the 12 packs of Pepsi® and can determine from the live image feed that the 12 packs of Pepsi are not at their designated location. The locating application 106 can determine that 12-packs or Pepsi should be in stock based in the date retrieved from the item file database and in response, can use machine vision to find the 12 packs of Pepsi® in the store using live image feeds of multiple image capturing devices. The central computing system 105 can alert an employee of the store to assist the customer 114 find the item.

In exemplary embodiments, the image capturing device 104 can a still image digital camera and/or a moving image camera.

Figure 2:
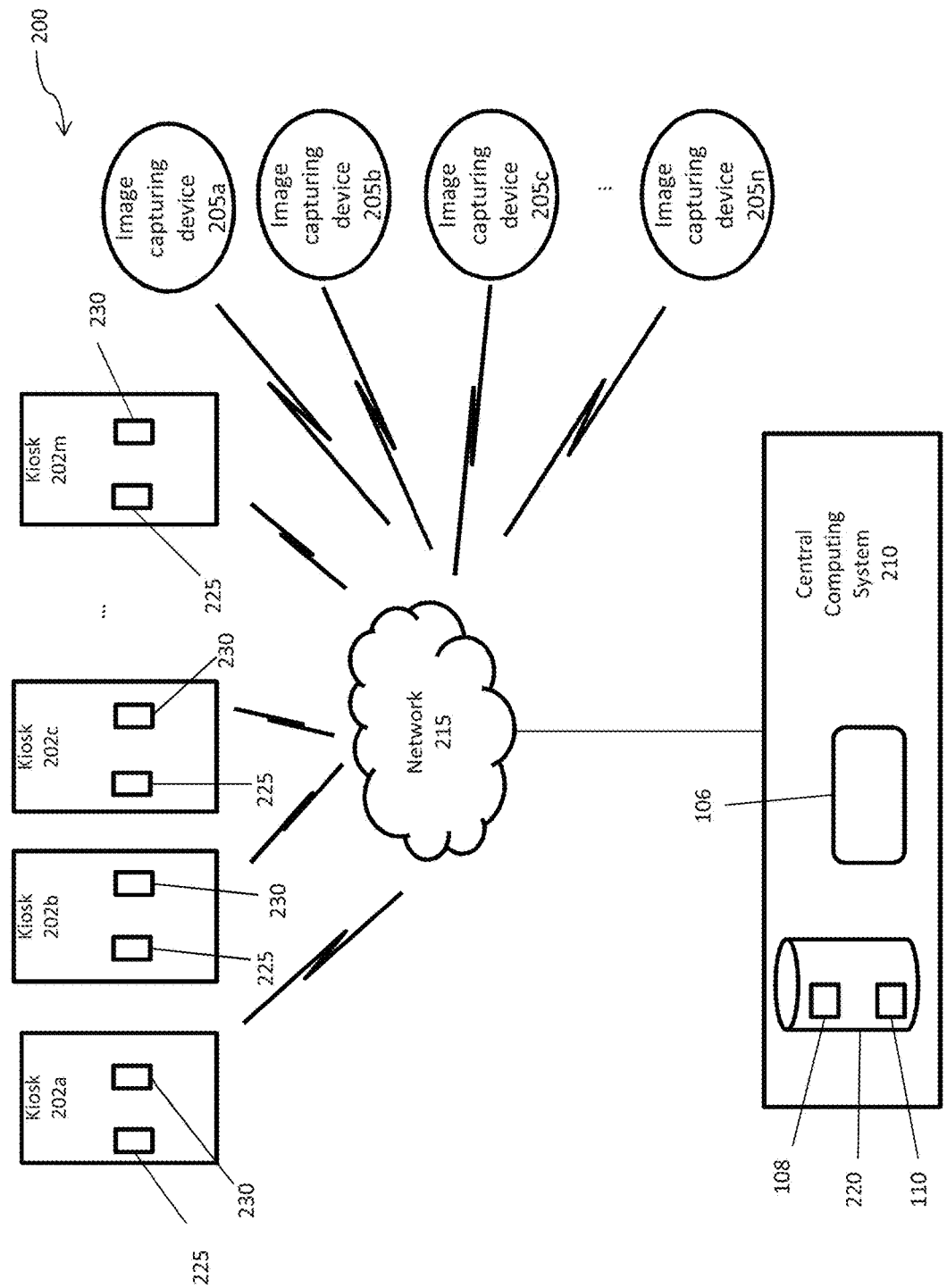
FIG. 2 illustrates an exemplary network environment for a locating system in accordance with exemplary embodiments of the present disclosure.
Figure 3A:
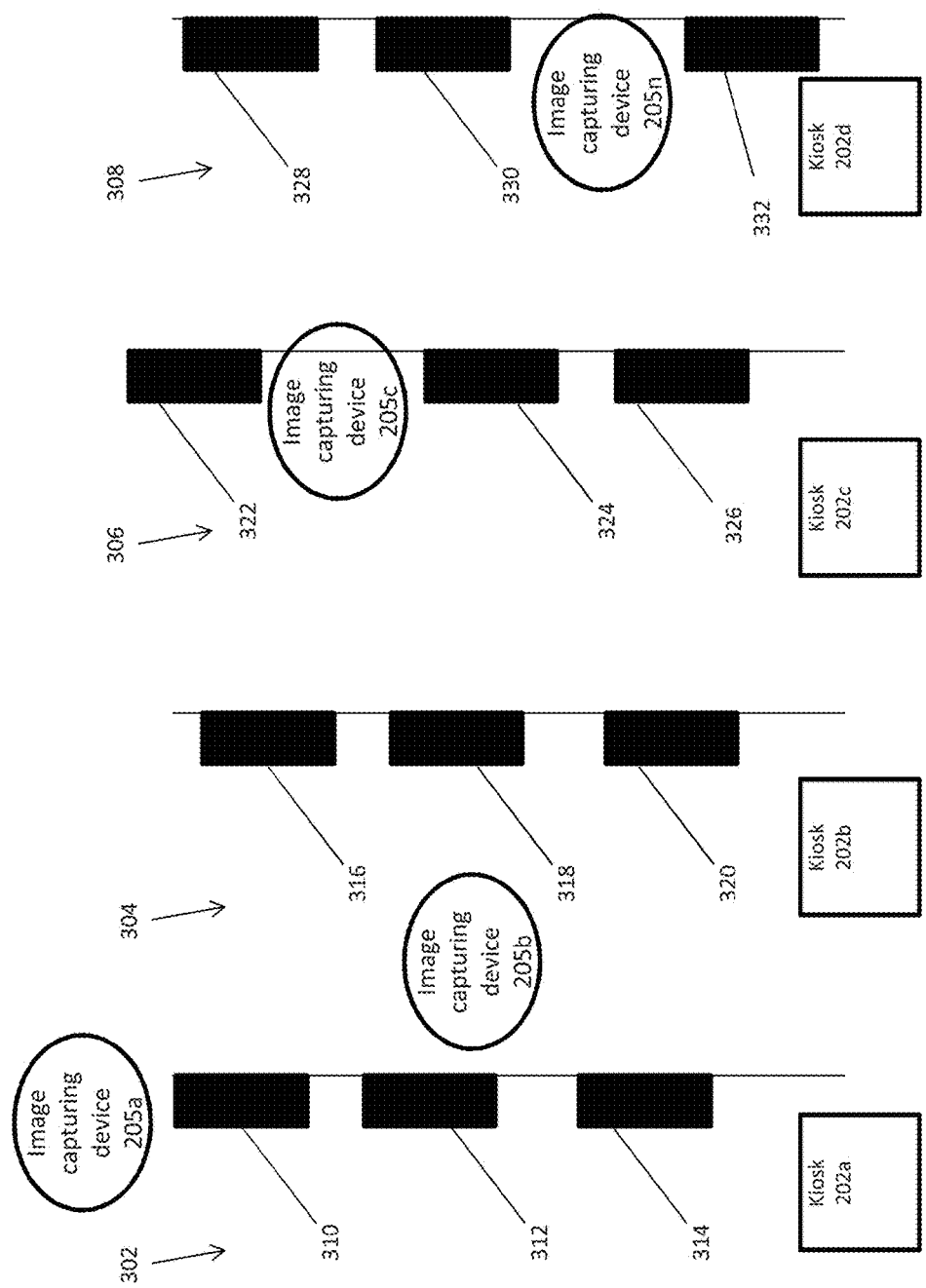
FIGS. 3A-C illustrate kiosks and image capturing devices disposed in the facility in accordance with exemplary embodiments.
Figure 3B:
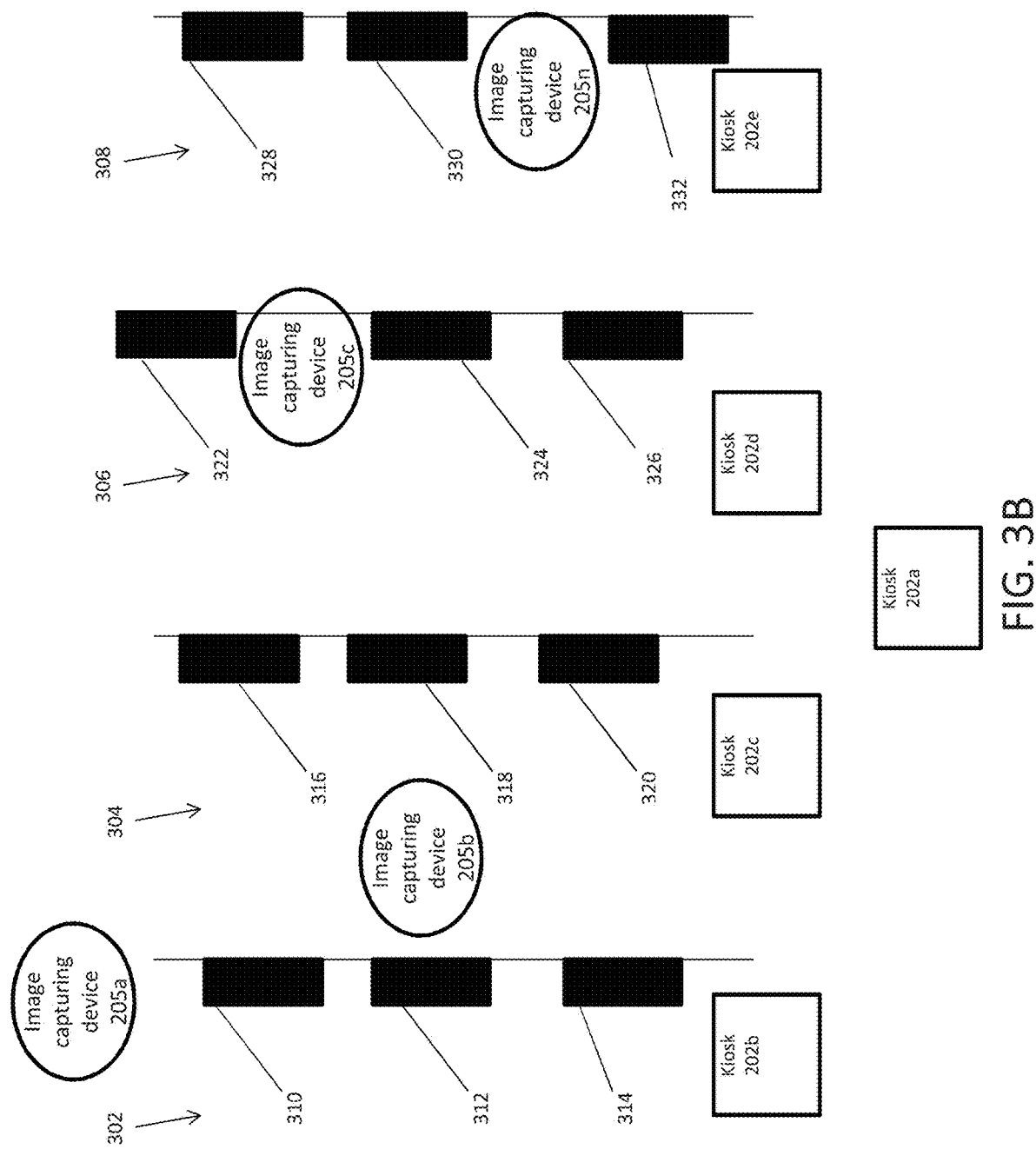
Figure 3C:
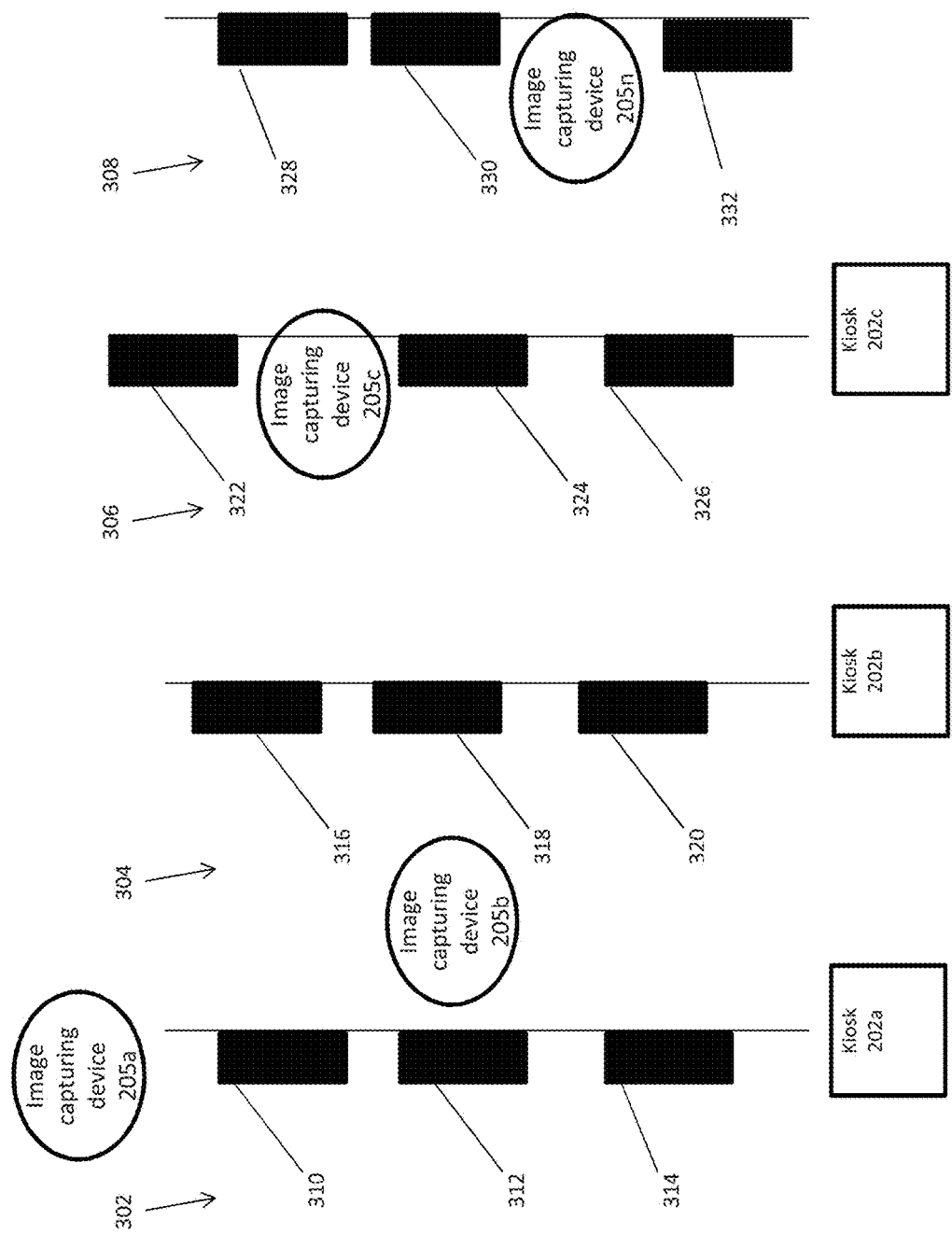

FIG. 2 illustrates an exemplary network environment in accordance with exemplary embodiments of the present disclosure. FIGS. 3A-C illustrate kiosks and image capturing devices disposed in the facility in accordance with exemplary embodiments. With reference to FIG. 2, the network environment 200 includes kiosks 202a-m, a central computing system 210 and image capturing devices 205a-n communicating via a network 215. The central computing system 210 can include a database 220 and the locating application 106. The kiosks 202a-m can include a processor 225 and a display 220. The database 220 can include the item file database 108 and the aisle-to-item location mapping database 110, as described herein.

In an example embodiment, one or more portions of network 215 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

Turning to FIG. 3A, in exemplary embodiments, physical objects 310-332 can be disposed in sections 302-308 of a facility. Each kiosk 202a-m can be associated with a particular section within the facility. For example a user can go to a section within a facility at which the physical object 318 is designated to be disposed, however, the user may not know the specific physical location of the physical object 318 within the section of the facility. For example, kiosk 202b can be associated with the section 304 of the facility. The user can input the search string in kiosk 202b. The kiosk 202b can receive the search string and transmit the search string to the central computing system 210, which can execute the locating application 106 to query the item file database 108 to retrieve data associated with the physical object 318 based on the search string. The locating application 106 can retrieve the physical object's 318 name, type, designated location and quantity of physical objects in the facility. The central computing system 210 can execute the locating application 106 to query the aisle-to-item location mapping database 110 to determine the section and specific physical location within the section 304 at which the physical object 318 is supposed to be disposed. The locating application 106 can determine which of the image capturing device 205a-n is closest (and/or suitably positioned) to the specific designated physical location of the physical object 318. For example, the locating application 106 can determine the image capturing device 205b is the closest in proximity to and/or suitably positioned with respect to the specific designated physical location of the physical object 318. The locating application 106 can control image capturing device 205b to capture a live image feed of the designated physical location of the physical object 318 and can switch an input feed of the kiosk 202b to display the live image feed at the kiosk 202b.

In some embodiments, the central computing system 210, via the locating application 106, may not select an image capturing device that is closest in proximity to the specific designated physical location, but may instead select an image capturing device that is suitably positioned to capture a live image feed of the specific designated location. As one example, the central computing system 210, via the locating application 106, can select an image capturing device based on an orientation and/or point-of-view of the image capturing device with respect to the specific designated physical location. That is the closest image capturing device to the specific designated location may have an orientation and/or point-of-view that prevents it from capturing the specific designated physical location or may currently be in-use to capture a live image feed of another specific physical location such that it is not available to capture the live image feed of the specific designated location. In response to determining that the closest image capturing device cannot capture a live image feed of the specific designated physical location, the central computing system 210, via the locating application 106, can identify another image capturing device that is positioned to capture a live image feed of the specific designated physical location. In some instance, the central computing system 210, via the locating application 106, can determine that the selected image capturing device may be disposed at a distance from the specific designated physical location such that the image capturing device may capture a live image feed of an area that includes the specific designated physical location as a small portion of the live image feed. In response, the central computing system, via the locating application 106, can control the image capturing device to zoom in on the specific designated location when capturing the live image feed. As another example, the central computing system, via the locating application 106, can determine that the closest or other suitably positioned image capturing device has an obstructed view of the specific designated location at the time the live image feed is requested. The obstruction result from one or more objects or individuals being disposed between the specific designated location and the image capturing device. In response, the central computing system 210, via the locating application 106, can identify another suitably positioned image capturing device having an unobstructed view of the specific designated physical location to capture the live image feed of the specific designated location.

In another embodiment, the specific designated physical location of the physical object 318 can be in a different section than the one associated with kiosk 202b, such as section 230, which is associated with kiosk 202c. The locating application 106 can prompt the user via the display of the kiosk 202b to go to kiosk 202c and search for the physical object 318 on kiosk 202c. In another embodiment, the kiosk 202b can provide the user the correct section of the facility in which the physical object is located and also show a live image feed of the specific physical location of the physical object.

Turning to FIG. 3B, in another embodiment, the kiosk 202*a* is located at the front of the facility, while kiosk 202*b-e* are associated with particular sections 302-308 of the facility and located at the front of each section of the facility. For example, the user can enter the facility and enter a search string in kiosk 202*a*. The kiosk 202*a* can transmit the search string to the central computing system, which can execute the locating application 106 to query the item file database 108. The locating application 106 can retrieve the name, type, designated location, and quantity of physical objects in the facility. The locating application 106 can also query the aisle-to-item location mapping database 110 to determine the section and specific physical location within the section 228 at which the physical object is supposed to be disposed. The locating application 106 can determine which of the image capturing device 205*a-n* is closest and suitably positioned to the specific designated physical location of the physical object 324, in section 230 which is associated with kiosk 202*d*. For example, the locating application 106 can determine the image capturing device 205*c* is the closest in proximity to and/or suitably positioned to the designated physical location of the physical object 324. The locating application 106 can control image capturing device 205*c* to capture a live image feed of the designated physical location of the physical object 324. The locating application 106, via kiosk 202*a*, can prompt the user to go to section 306 and visit kiosk 202*d*. The locating application 106 can switch an input feed of the kiosk 202*d* to display the live image feed at the kiosk 202*d*.

In another embodiment, the locating application 106 can determine the physical object 324 is located in section 306 associated with kiosk 202*d*. The locating application 106 on kiosk 202*a* can prompt the user to go to section 306 and search for the physical object using kiosk 202*d*.

Turning to FIG. 3C, in exemplary embodiments, kiosks 202*a-c* can be associated with multiple sections. For example, kiosk 202*a* can be associated with section 302-304, kiosk 202*b* can be associated with section 304-306 and kiosk 202*c* can be associated with sections 306-308. Kiosk 202*a* can be configured to search and retrieve a live image feed from an image capturing device for physical objects 310-320 disposed in sections 302-304. Kiosk 202*b* can be configured to search and retrieve a live image feed from an image capturing device for physical objects 316-326 disposed in sections 304-306. Kiosk 202*c* can be configured to search and retrieve a live image feed from an image capturing device for physical objects 322-332 disposed in sections 306-308.

Figure 4:
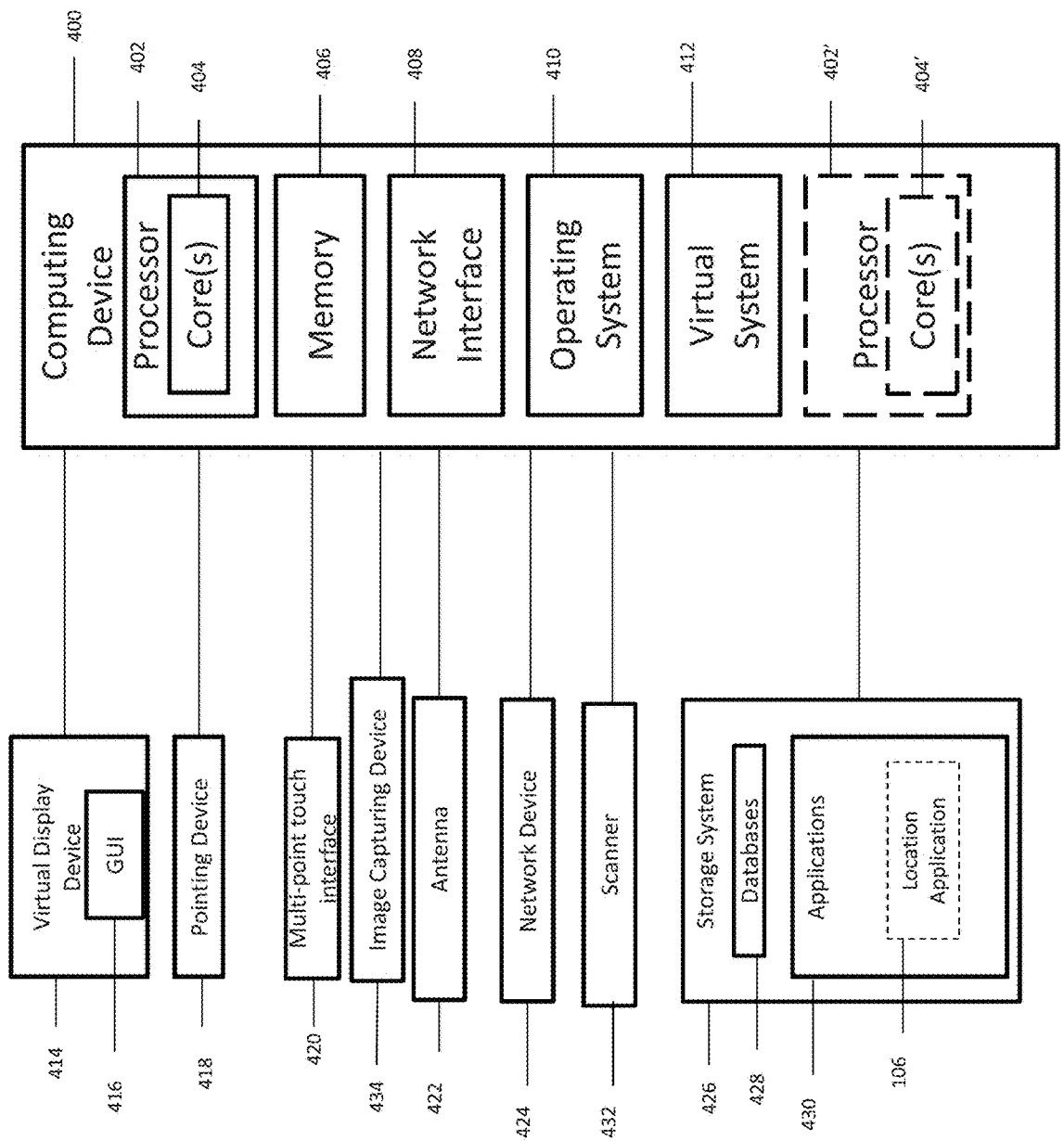
FIG. 4 is a block diagram of an example computing system for implementing exemplary embodiments of the present disclosure.

FIG. 4 is a block diagram of an example computing device for implementing exemplary embodiments of the present disclosure. In exemplary embodiments, the computing device 400 can implement embodiments of central computing system 210 and/or the kiosks 202*a-m*. The computing device 400 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives, one or more solid state disks), and the like. For example, memory 406 included in the computing device 400 can store computer-readable and computer-executable instructions or software (e.g., locating application 106) for implementing exemplary operations of the computing device 400. The computing device 400 also includes configurable and/or programmable processor 402 and associated core(s) 404, and optionally, one or more additional configurable and/or programmable processor(s) 402' and associated core(s) 404' (for example, in the case of computer systems having multiple processors/cores), for executing computer-readable and computer-executable instructions or software stored in the memory 406 and other programs for implementing exemplary embodiments of the present disclosure. Processor 402 and processor(s) 402' can each be a single core processor or multiple core (404 and 304') processor. Either or both of processor 402 and processor(s) 402' can be configured to execute one or more of the instructions described in connection with central computing system 210.

Virtualization can be employed in the computing device 400 so that infrastructure and resources in the computing device 400 can be shared dynamically. A virtual machine 412 can be provided to handle a process running on multiple processors so that the process appears to be using only one computing resource rather than multiple computing resources. Multiple virtual machines can also be used with one processor.

Memory 406 can include a computer system memory or random access memory, such as DRAM, SRAM, EDO RAM, and the like. Memory 406 can include other types of memory as well, or combinations thereof.

A user can interact with the computing device 400 through a visual display device 414, such as a computer monitor, which can display one or more graphical user interfaces 416, multi touch interface 420, an image capturing device 434, a scanner 432 and a pointing device 418. The scanner 432 can be a barcode reader or RFID reader configured to read optical machine readable representations such as barcodes, QR codes and RFID tags.

The computing device 400 can also include one or more storage devices 426, such as a hard-drive, CD-ROM, or other computer readable media, for storing data and computer-readable instructions and/or software that implement exemplary embodiments of the present disclosure (e.g., locating application 106). For example, exemplary storage device 426 can include one or more databases 428 for storing information regarding the physical objects. The databases 428 can be updated manually or automatically at any suitable time to add, delete, and/or update one or more data items in the databases.

The computing device 400 can include a network interface 408 configured to interface via one or more network devices 424 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 422 to facilitate wireless communication (e.g., via the network interface) between the computing device 400 and a network and/or between the computing device 400 and other computing devices. The network interface 408 can include a built-in network adapter, network interface card, PCMCIA network card, card bus network adapter, wireless network adapter, USB network adapter, modem or any other device suitable for interfacing the computing device 400 to any type of network capable of communication and performing the operations described herein.

The computing device 400 can run any operating system 410, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 400 and performing the operations described herein. In exemplary embodiments, the operating system 410 can be run in native mode or emulated mode. In an exemplary embodiment, the operating system 410 can be run on one or more cloud machine instances.

The processes described herein can be executed by one or more application(s) 106. For example, for embodiments in which the computing device 400 correspond to a the central computing system 210, as described herein, the computing device 400 can execute the application 106 to receive the search input string and query the databases item file database 108 and the aisle to item location mapping database 110 to retrieve the exact physical location of a physical object.

Figure 5:
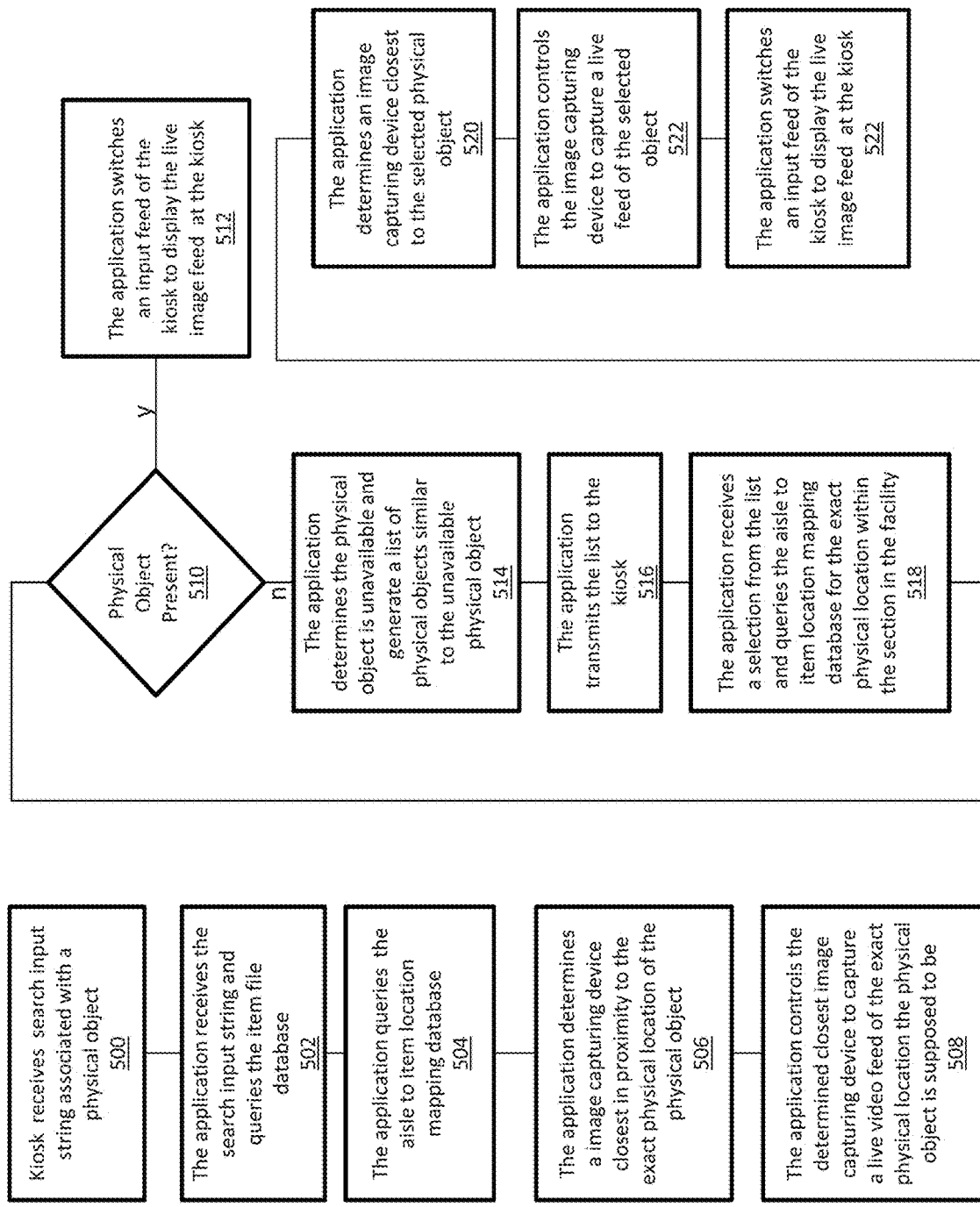
FIG. 5 is a flowchart illustrating an exemplary process for a locating system in accordance with exemplary embodiments of the present disclosure.

FIG. 5 is a flowchart illustrating an exemplary process in accordance with exemplary embodiments of the present disclosure. In exemplary embodiments, physical objects are disposed in a facility within multiple sections. Image capturing devices (e.g., embodiments of devices 104, 205a-n) and kiosks (e.g., embodiments of kiosks 102. 202a-m) are disposed in the facility. In some embodiments, one kiosk is associated with one section of the store. In other embodiments, a kiosk is disposed in the front of the facility controlling the remaining kiosks which are disposed at the front of each section, associated their respective sections. In another embodiment, each kiosk can be associated with multiple sections.

In operation 500 a kiosk can receive a search string associated with a physical object. The search string can be an alphanumeric string. The kiosk can transmit the search input string to the a central computing system (e.g., embodiments of the systems 105, 210).

In operation 502, the central computing system can execute a locating application (e.g., embodiments of the locating application 106) to receive the search string and use the search string to query an item file database (e.g., embodiments of the item file database 108). The central computing system can execute the locating application to retrieve the name, type, designated location and the quantity of the physical objects in the facility. In operation 504, central computing system can execute the locating application to query the aisle-to-item location mapping database (e.g., embodiments of the aisle-to-item location mapping database 110). The aisle-to-item location mapping database can return a specific physical location within a section of the facility.

In operation 506, the central computing system can execute the locating application to determine which of the image capturing devices is closest in proximity to and/or suitably positioned to the specific physical location of the physical object. In operation 508, the central computing system can execute the locating application to control the determined closest and/or suitably positioned image capturing device to capture a live image feed of the specific physical location at which the physical object is supposed to be disposed. The live image feed can be a moving image or a still image.

In operation 510, the central computing system can execute the locating application to determine if the physical object is at the specific physical location captured in the live image feed by the image capturing device. For example, the application can use machine vision to determine whether the physical object is present in the live image feed. In response to determining the physical object is present in the live image feed, in operation 512, the locating application can switch an input feed of the kiosk to display the live image feed (as shown in FIG. 1 114) at the kiosk.

In operation 514, in response to determining the physical object is not present in the live image feed, central computing system can execute the locating application to determine the physical object is unavailable and generate a list of physical objects similar to the unavailable physical object. In operation 516, the central computing system can execute the locating application to transmit the list to the kiosk. In operation 518, the central computing system can execute the location application to receive a selected similar physical object from the list in response to an interaction between the user and the user interface of the kiosk and can query the aisle-to-item location mapping database for the specific physical location within the section in the facility at which the selected similar physical object is disposed. In operation 520, the central computing system can execute the locating application to determine an image capturing device closest and/or suitably positioned to the selected physical object. In operation 522, the central computing system can execute the locating application to control the image capturing device to capture a live image feed of the specific physical location at which the selected similar physical object is disposed. In operation 524, the application can switch an input feed of the kiosk to display the live image feed of the specific physical location at the kiosk.

Exemplary flowcharts are provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

We claim:

1. A system for locating physical objects, the system comprising:
   a computing system;
   a plurality of image capturing devices disposed in a facility operatively coupled to the computing system, wherein the facility includes a plurality of physical objects disposed in a plurality of sections;
   a plurality of kiosks, communicatively coupled to the computing system and the plurality of image capturing devices, at least one of kiosks programmed to receive an input string associated with at least one physical object and transmit a request based on the input string to the computing system for a physical location of the at least one physical object,
   wherein, in response to receipt of the request, the computing system is configured to:
      determine the physical location of the at least one physical object based on stored data;
      identify a first one of the plurality of image capturing devices closest to the at least one physical object based on a proximity of the first one of the plurality of image capturing devices to the physical location;
      control the first one of the plurality of image capturing devices to capture a live image feed of the physical location at which the physical object should be disposed; and switch an input feed of the at least one of the kiosks to display the live image feed at the kiosk;

fail to detect that the at least one physical object is included in the live image feed;

in response to failing to detect the at least one physical object in the live image feed, determine a second physical location of a substitute physical object associated with the at least one physical object based on stored data;

detect the substitute physical object in a second live image feed from the first one of the plurality of image capturing device at the second physical location; and switch the input feed to the second-live image feed including the substitute physical object, wherein at least a first one of the kiosks is located at an entrance of a facility and is associated with a first subset of the image capturing devices to view multiple sections of the facility and at least a second one of the kiosks is disposed within at least one of the multiple sections within the facility and is associated with a second subset of image capturing devices to view multiple sub-sections of the sections.

2. The system in claim 1, wherein the computing system identifies the substitute physical object for the at least one physical object.

3. The system in claim 2, wherein the computing system identifies a second one of the plurality of image capturing devices configured to capture the second live image feed of a second physical location at which the substitute physical object should be disposed.

4. The system in claim 1, wherein the computing system analyzes the live image feed captured by the first one of the image capturing device to confirm the at least one physical object is included in the live image feed.

5. The system in claim 1, wherein the at least one of the kiosks is located at an entrance of a facility and is associated with a first subset of the image capturing devices to view multiple sections of the facility.

6. The system in claim 1, wherein the plurality of kiosks are associated with particular areas of a facility and each kiosk in the plurality of kiosks is associated with a subset of the plurality of image capturing devices.

7. A method for locating physical objects, the method comprising:

receiving, via at least one of a plurality of kiosks, a request including an input string at a central computing system, the input string being associated with at least one physical object;

determining, via the computing system, a physical location associated with the at least one physical object from stored data;

identifying, via the computing system, a first one of a plurality of image capturing devices closest to the at least one physical object based on a proximity of the first one of the plurality of image capturing devices to the physical location;

controlling, via the computing system, the first one of the plurality of image capturing devices to capture a live image feed of the physical location at which the physical object should be disposed; and switching, via the computing system, an input feed of the at least one of the kiosks to display the live image feed at the kiosk failing, via the computing system, to detect that the at least one physical object is included in the live image feed;

in response to failing to detect the at least one physical object in the live image feed, determining, via the computing system, a second physical location of a substitute physical object associated with the at least one physical object based on stored data;

detecting the substitute physical object in the second live image feed from the first one of the plurality of image capturing device at the second physical location; and switching, via the computing system, the input feed to the second live image feed including the substitute physical object, wherein at least a first one of the kiosks is located at an entrance of a facility and is associated with a first subset of the image capturing devices to view multiple sections of the facility and at least a second one of the kiosks is disposed within at least one of the multiple sections within the facility and is associated with a second subset of image capturing devices to view multiple sub-sections of the facility.

8. The method in claim 7, further comprising identifying, via the computing system, the substitute physical object for the at least one physical object.

9. The method in claim 7, further comprising identifying, via the computing system, a second one of the plurality of image capturing devices configured to capture the second live image feed of a second physical location at which the substitute physical object should be disposed.

10. The method in claim 7, further comprising analyzing, via the computing system, the live image feed captured by the first one of the image capturing device to confirm the at least one physical object is included in the live image feed.

11. The method in claim 7, wherein the at least one of the kiosks is located at an entrance of a facility and is associated with a first subset of the image capturing devices to view multiple sections of the facility.

12. The method in claim 7, wherein the plurality of kiosks are associated with particular areas of a facility and each kiosk in the plurality of kiosks is associated with a subset of the plurality of image capturing devices.

* * * * *